United States Patent [19]

Weaver

[11] 3,998,801
[45] Dec. 21, 1976

[54] BENZOTHIAZOLYL-AZO-TETRAHY-DROQUINOLINE COMPOUNDS
[75] Inventor: Max A. Weaver, Kingsport, Tenn.
[73] Assignee: Eastman Kodak Company, Rochester, N.Y.
[22] Filed: Apr. 18, 1974
[21] Appl. No.: 462,166

Related U.S. Application Data
[63] Continuation-in-part of Ser. No. 201,186, Nov. 22, 1971, abandoned, which is a continuation-in-part of Ser. No. 167,041, July 28, 1971, Pat. No. 3,816,390.

[52] U.S. Cl. .......................... 260/155; 260/287 R; 260/305
[51] Int. Cl.² .................. C09B 29/36; D06P 1/08; D06P 3/24
[58] Field of Search .......................... 260/155, 158
[56] References Cited
UNITED STATES PATENTS
3,329,669  7/1967  Sartori ............................ 260/158

Primary Examiner—Floyd D. Higel
Attorney, Agent, or Firm—Donald W. Spurrell; Daniel B. Reece, III

[57] ABSTRACT

Monoazo compounds, which exhibit improved light, wash and crock fastness, build-up, migration, sublimation fastness, and dyeability properties on polyamide textile materials on which the compounds produce red to violet shades, which have the general formula

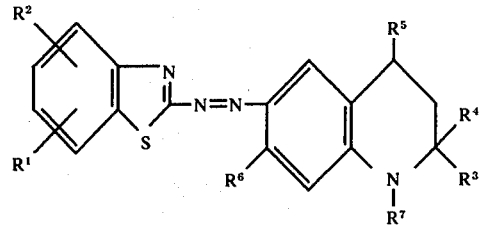

in which $R^1$ is hydrogen, unsubstituted or substituted alkyl, unsubstituted or substituted alkoxy, cyclohexoxy, aryloxy, halogen, or alkanoylamino; $R^2$ is hydrogen, alkyl, alkoxy or halogen; $R^3$ is hydrogen or lower alkyl; $R^4$ and $R^5$ each is hydrogen or methyl; $R^6$ is hydrogen, alkyl, alkoxy or acylamido; and $R^7$ is alkyl, allyl, or certain substituted alkyl groups.

9 Claims, No Drawings

BENZOTHIAZOLYL-AZO-TETRAHYDROQUINOLINE COMPOUNDS

This invention concerns certain novel benzothiazolyl-azo compounds and polyamide textile materials dyed therewith.

The novel compounds of the invention have the general formula

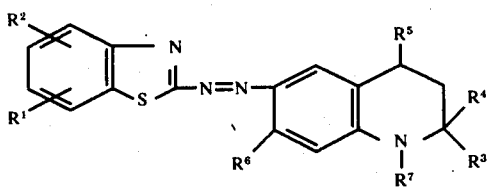

wherein $R^1$ is hydrogen; lower alkyl; lower alkyl substituted with hydroxy, carbamoyl, halogen, lower alkylsulfonyl, lower alkylsulfonamido, aryl, lower alkoxy, —NH-CO—$R^8$ or —OCO—$R^8$; lower alkoxy; lower alkoxy substituted with hydroxy, carbamoyl, halogen, lower alkylsulfonyl, lower alkylsulfonamido, aryl, lower alkoxy, —NHCO—$R^8$ or —OCO—$R^8$; cyclohexoxy; lower alkylcyclohexoxy; aryloxy; halogen; or lower alkanoylamino;

$R^2$ is hydrogen or, when $R^1$ is hydrogen, lower alkyl or lower alkoxy, $R^2$ also can be lower alkyl, lower alkoxy or halogen;

$R^3$ is methyl or, when $R^4$ and $R^5$ each is hydrogen, $R^3$ can be lower alkyl;

$R^4$ and $R^5$ each is hydrogen or methyl;

$R^6$ is hydrogen, lower alkyl, lower alkoxy or —NHCO—$R^8$; and $R^7$ is alkyl of up to about eight carbon atoms; allyl; or lower alkyl substituted with halogen, lower alkoxy, cyano, aryl, cyclohexyl, alkylcarbamoyloxy, arylcarbamoyloxy, ureido, alkylureido, —NHCO—$R^8$, —OCO—$R^8$ or

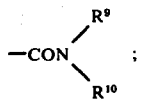

in which each aryl group is phenyl or phenyl substituted with lower alkyl, lower alkoxy or halogen;

$R^8$ is hydrogen; lower alkyl; lower alkyl substituted with hydroxy, lower alkoxy, lower alkylthio, lower alkanoyloxy, cyano, carbamoyl, aryl, halogen, aryloxy or lower alkylsulfonyl; cyclohexyl; lower alkylcyclohexyl; lower alkoxy; furyl; lower alkenyl; or aryl;

$R^9$ individually is hydrogen, lower alkyl, cyclohexyl, aryl, hydroxymethyl, benzyl or 1,1-dimethyl-3-oxobutyl;

$R^{10}$ individually is hydrogen or, when $R^9$ is hydrogen or lower alkyl, $R^{10}$ also can be lower alkyl; and $R^9$ and $R^{10}$ collectively are pentamethylene or ethyleneoxyethylene.

My novel compounds are useful for dyeing synthetic textile materials such as cellulose acetate, polyester and polyamide fibers on which the azo compounds exhibit excellent fastness and dyeability properties. The novel azo compounds are particularly valuable for producing neutral red to bluish-red shades on polyamide fibers on which the azo compounds exhibit improved fastness to light, washing and sublimation and improved dyeability properties including build-up, migration and crock-fastness. The compounds of the invention are suitable for dyeing polyamide carpet where brightness, migration, fastness to light and crocking and color yield are of great importance.

As used herein to describe an alkyl group or a group containing an alkyl moiety, "lower" designates a carbon content of one to about four carbon atoms. For example, the alkyl groups and the alkyl moieties of the alkylsulfonyl, alkoxy and alkanoylamino groups set forth in the definitions of $R^1$, $R^2$, $R^3$, $R^4$, $R^6$ and/or $R^7$ can be methyl, ethyl, propyl, isopropyl, butyl, isobutyl, etc. Chlorine and bromine are typical of the halogen atoms which can be present on the novel azo compounds. As used herein, "aryl" means unsubstituted phenyl or phenyl substituted with lower alkyl, lower alkoxy or halogen, e.g., tolyl, anisyl, ethoxyphenyl, bromophenyl, dichlorophenyl, etc. The substituents recited generically in the definitions of $R^1$ through $R^{10}$ are well known to those skilled in the art. When $R^7$ is lower alkyl substituted with —NHCO—$R^8$, the lower alkyl-bridging group preferably is ethylene or trimethylene.

A group of my compounds which, because of their good cost:performance ratio, are particularly valuable for dyeing polyester fibers have the formula

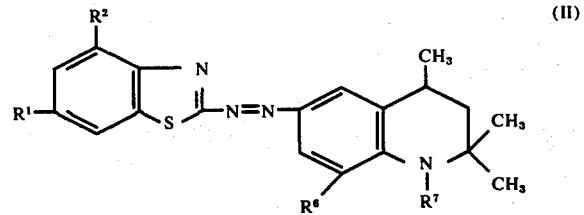

wherein $R^1$ is hydrogen, lower alkyl, lower alkoxy, lower alkanoylamino, phenoxy, chlorine, bromine, lower alkoxyethoxy, lower alkoxypropoxy, lower alkylsulfonamidoethyl, lower alkylsulfonamidopropyl, lower alkanoylaminoethyl or lower alkanoylaminopropyl;

$R^2$ is hydrogen or, when $R^1$ is hydrogen, lower alkyl or lower alkoxy, $R^2$ also can be lower alkyl, lower alkoxy, chlorine or bromine;

$R^6$ is hydrogen, methyl or lower alkanoylamino; and $R^7$ is lower alkyl or the group —(CH$_2$)$_n$—X in which n is 2 or 3 and X is carbamoyl, lower alkylcarbamoyl, lower dialkylcarbamoyl, lower alkanoylamino or lower alkoxycarbonylamino.

The azo compounds of Formula (II) in which $R^1$ is methyl, methoxy or ethoxy; $R^2$ is hydrogen; $R^6$ is hydrogen, methyl or acetamido and $R^7$ is lower alkyl, carbamoylethyl or acetamidoethyl are especially preferred.

The novel azo compounds are prepared by diazotizing an amine having the formula

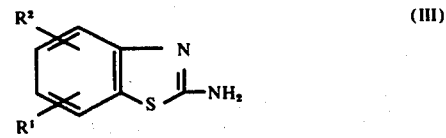

and coupling the resulting diazonium salt with a coupler having the formula

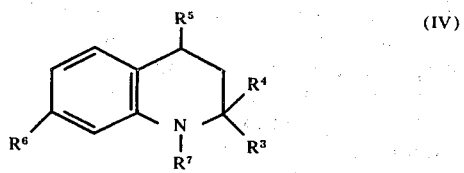

The amines of Formula (III) are prepared according to published techniques. For example, an aniline compound can be reacted with a thiocyanate in the presence of bromine and acetic acid to yield the corresponding o-thiocyanatoaniline which then is treated with alkali to effect ring closure. Another technique that can be used is that of reacting an aniline compound with a thiocyanate in the presence of a mineral acid to obtain an arylthiourea which is converted to the 2-aminobenzothiazole by treatment with bromine.

The couplers of Formula (IV) also are synthesized by known procedures using known or readily-obtainable intermediates. For example, an N-cyanoalkyl-1,2,3,4-tetrahydroquinoline can be reduced to the corresponding N-aminoalkyl compound which then is treated with a variety of acylating agents to yield N-acylaminoalkyl-1,2,3,4-tetrahydroquinoline couplers. The cyanoalkyl compound also can be converted to the analogous carbamoylalkyl compound by hydrolysis of the former. These and additional techniques are described in detail in the literature, e.g., U.S. Pat. Nos. 3,247,211 and 3,254,073.

The azo compounds of the invention, their preparation and their use are further illustrated by the following examples.

EXAMPLES 1–10

To 50 ml. of concn. $H_2SO_4$ is added 7.2 g. $NaNO_2$ portionwise with stirring. The solution is solid and 100 ml. of 1:5 acid is added below 20° C. The mixture is cooled and 2-amino-6-methoxybenzothiazole (18.0 g.) is added, followed by 100 ml. of 1:5 acid, all below 5° C. The reaction is stirred at 0–5° C. for two hours. The following couplers (0.01 m.) are dissolved in 40 ml. of 1:5 acid.

N-(2-Carbamylethyl)-2,7-dimethyl-1,2,3,4-tetrahydroquinoline (Example 1)
N-(2-Carbamylethyl)-2,2,4,7-tetramethyl-1,2,3,4-tetrahydroquinoline (Example 2)
N-(2-Acetamidoethyl)-2,7-dimethyl-1,2,3,4-tetrahydroquinoline (Example 3)
N-(2-Acetamidoethyl)-2,2,4,7-tetramethyl-1,2,3,4-tetrahydroquinoline (Example 4)
N-Ethyl-7-acetamido-2,2,4-trimethyl-1,2,3,4-tetrahydroquinoline (Example 5)
N-Ethyl-2,2,4-trimethyl-1,2,3,4-tetrahydroquinoline (Example 6)
N-Ethyl-2,2,4,7-tetramethyl-1,2,3,4-tetrahydroquinoline (Example 7)
N-Isobutyl-7-acetamido-2,2,4-trimethyl-1,2,3,4-tetrahydroquinoline (Example 8)
N-(2-Propionamidoethyl)-2,7-dimethyl-1,2,3,4-tetrahydroquinoline (Example 9)
N-(2-Carbamylethyl)-2-isopropyl-7-methyl-1,2,3,4-tetrahydroquinoline (Example 10)

To each chilled coupler solution is added a 0.01 mole aliquot of diazonium solution. The coupling mixtures are buffered by the addition of ammonium acetate and allowed to stand for one hour. Each azo product is precipitated by the addition of water, collected by filtration, washed with water and dried in air. If needed, the azo compounds are purified by slurrying in hot methanol, cooling, filtering and washing with cold methanol. Each of the azo compounds obtained exhibits excellent fastness to light and good dyeability on polyamide fibers. The azo compounds of Examples 1, 2, 3, 4, 6, 7, 9 and 10 produce red shades while the azo compounds of Examples 5 and 8 produce violet shades on polyamide fibers.

EXAMPLE 11

To 150 g. of 60% acetic acid containing 10 g. of concn. $H_2SO_4$ is added 8.2 g. (0.05 mole) of 2-amino-6-methylbenzothiazole at room temperature. The solution is cooled to −5° C. and a solution of 3.6 g. $NaNO_2$ in 20 ml. concn. $H_2SO_4$ is added below 0° C. The reaction mixture is stirred at −5° to 9° C. for 1.5 hours. The coupler N-(2-acetamidoethyl)-2,7-dimethyl-1,2,3,4-tetrahydroquinoline (0.005 mole) is dissolved in 20-ml. of 15% $H_2SO_4$ and the solution chilled in an ice bath. To the chilled coupler solution is added a 0.005 mole aliquot of the diazonium solution. The coupling mixture is treated with ammonium acetate to a pH of 3–4 and allowed to stand for one hour. The azo compound product is precipitated by addition of water, collected by filtration, washed with water and dried in air. The compounds are recrystallized or reslurried in methanol or ethanol for purification. The azo compound obtained produces a fast red shade on polyamide fibers and has the formula

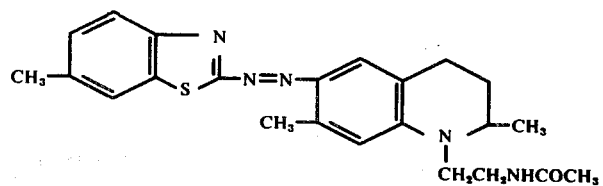

The azo compounds set forth in the following table conform to Formula (I) and are prepared according to the procedures described hereinabove. The color given for each of the compounds refers to the shade it produces on polyamide fibers.

TABLE 1

| Example | $R^1, R^2$ | $R^3, R^4, R^5, R^6$ | $R^7$ | Color |
| --- | --- | --- | --- | --- |
| 12 | 4-CH₃ | 7-NHCOCH₃-2,2,4,-tri-CH₃ | —C₂H₅ | Violet |
| 13 | 5-CH₃ | 7-NHCOOC₂H₅-2,2,4-tri-CH₃ | —CH₂CH(CH₃)₂ | Violet |
| 14 | 6-CH₃ | 7-NHCOCH₃-2,2,4-tri-CH₃ | —C₂H₅ | Violet |
| 15 | 4,6-di-CH₃ | 7-NHCOCH₃-2,2,4-tri-CH₃ | —C₂H₅ | Violet |
| 16 | 4-CH₂CH₂OH | 7-NHCOCH₃-2,2,4-tri-CH₃ | —C₂H₅ | Violet |
| 17 | 6-OCH₂CH₂OCH₃ | 7-NHCOCH₃-2,2,4-tri-CH₃ | —C₂H₅ | Violet |
| 18 | 6-OCH₂CH₂OCH₃ | 7-NHCOC₆H₅-2,2,4-tri-CH₃ | —C₂H₅ | Violet |
| 19 | 6-CH₃ | 7-NHCOC₆H₁₁-2,2,4-tri-CH₃ | —C₂H₅ | Violet |
| 20 | 6-CH₃ | 2,2,4,7-tetra-CH₃ | —CH₂CH₂CONH₂ | Red |

TABLE 1-continued

| Example 1 | $R^1, R^2$ | $R^3, R^4, R^5, R^6$ | $R^7$ | Color |
|---|---|---|---|---|
| 21 | 6-CH$_3$ | 2,2,4-tri-CH$_3$ | —CH$_2$CH$_2$CONH$_2$ | Red |
| 22 | 6-CH$_3$ | 7-Cl-2,2,4-tri-CH$_3$ | —CH$_2$CH$_2$CONH$_2$ | Red |
| 23 | 6-CH$_3$ | 2,7-di-CH$_3$ | —CH$_2$CH$_2$CONH$_2$ | Red |
| 24 | 6-CH$_3$ | 2,7-di-CH$_3$ | —CH$_2$CH$_2$NHSO$_2$CH$_3$ | Red |
| 25 | 6-CH$_3$ | 2,7-di-CH$_3$ | —CH$_2$CH$_2$NHCOC$_6$H$_5$ | Red |
| 26 | 6-CH$_3$ | 2,7-di-CH$_3$ | —CH$_2$CH$_2$NHCOCH$_2$Cl | Red |
| 27 | 6-CH$_3$ | 2,7-di-CH$_3$ | —CH$_2$CH$_2$NHCOCH$_2$OCH$_3$ | Red |
| 28 | 6-CH$_3$ | 2,7-di-CH$_3$ | —CH$_2$CH$_2$NHCOCH$_2$OH | Red |
| 29 | 6-CH$_3$ | 2,7-di-CH$_3$ | —CH$_2$CH$_2$Cl | Red |
| 30 | 6-CH$_3$ | 2,7-di-CH$_3$ | —CH$_2$CH$_2$NHCOOC$_2$H$_5$ | Red |
| 31 | 6-CH$_3$ | 2,2,4,7-tetra-CH$_3$ | —CH$_2$CH$_2$OOCCH$_3$ | Red |
| 32 | 6-CH$_3$ | 2,2,4,7-tetra-CH$_3$ | —CH$_2$CH$_2$OOCOC$_2$H$_5$ | Red |
| 33 | 6-CH$_3$ | 2,2,4,7-tetra-CH$_3$ | —CH$_2$CH$_2$OOCNHC$_6$H$_5$ | Red |
| 34 | 6-CH$_3$ | 2,2,4,7-tetra-CH$_3$ | —CH$_2$CH$_2$OOCNHC$_6$H$_5$ | Red |
| 35 | 6-CH$_3$ | 2,2,4,7-tetra-CH$_3$ | —CH$_2$CH$_2$CONHCH(CH$_3$)$_2$ | Red |
| 36 | 6-CH$_3$ | 2,2,4,7-tetra-CH$_3$ | —CH$_2$CH$_2$CONHCH$_2$C$_6$H$_5$ | Red |
| 37 | 6-CH$_3$ | 2,2,4,7-tetra-CH$_3$ | —CH$_2$CH$_2$CONCH$_2$CH$_2$OCH$_2$ | Red |
| 38 | 6-CH$_3$ | 2,2,4,7-tetra-CH$_3$ | —CH$_2$CH$_2$CONHCH$_2$OH | Red |
| 39 | 6-CH$_3$ | 2,2,4,7-tetra-CH$_3$ | —CH$_2$CH$_2$OCH$_3$ | Red |
| 40 | 6-CH$_3$ | 2,2,4,7-tetra-CH$_3$ | —CH$_2$CH$_2$OC$_6$H$_5$ | Red |
| 41 | 6-CH$_3$ | 2,2,4,7-tetra-CH$_3$ | —CH$_2$CH$_2$CONHCH$_3$ | Red |
| 42 | 6-OC$_2$H$_5$ | 7-NHCOCH$_3$-2,2,4-tri-CH$_3$ | —C$_2$H$_5$ | Violet |
| 43 | 6-OC$_2$H$_5$ | 7-NHCOCH$_3$-2,2,4-tri-CH$_3$ | —CH$_2$CH$_2$OC$_2$H$_5$ | Violet |
| 44 | 6-OC$_2$H$_5$ | 7-NHCOCH$_3$-2,2,4-tri-CH$_3$ | —CH$_2$CH$_2$CN | Violet |
| 45 | 6-OC$_2$H$_5$ | 7-NHCOCH$_3$-2,2,4-tri-CH$_3$ | —CH$_2$CH$_2$C$_6$H$_5$ | Violet |
| 46 | 6-OC$_2$H$_5$ | 7-NHCOCH$_2$Cl-2,2,4-tri-CH$_3$ | —C$_2$H$_5$ | Violet |
| 47 | 6-OC$_2$H$_5$ | 7-NHCOCH$_2$OH-2,2,4-tri-CH$_3$ | —C$_2$H$_5$ | Violet |
| 48 | 6-OC$_2$H$_5$ | 7-NHCO(CH$_2$)$_3$OH-2,2,4-tri-CH$_3$ | —C$_2$H$_5$ | Violet |
| 49 | 6-OC$_2$H$_5$ | 7-NHCOC$_6$H$_{11}$-2,2,4-tri-CH$_3$ | —C$_2$H$_5$ | Violet |
| 50 | 6-OC$_2$H$_5$ | 7-NHCOC$_2$H$_5$-2,2,4-tri-CH$_3$ | —CH$_2$CH$_2$CONH$_2$ | Violet |
| 51 | 6-OC$_2$H$_5$ | 7-NHCOC$_2$H$_5$-2,2,4-tri-CH$_3$ | —CH$_2$CH$_2$OOCCH$_3$ | Violet |
| 52 | 6-OC$_2$H$_5$ | 2,2,4-tri-CH$_3$ | —CH$_2$CH$_2$CONH$_2$ | Red |
| 53 | 6-OC$_2$H$_5$ | 2-CH(CH$_3$)$_2$ | —CH$_2$CH$_2$CONH$_2$ | Red |
| 54 | 6-OC$_2$H$_5$ | 2-CH$_3$ | —CH$_2$CH$_2$CONH$_2$ | Red |
| 55 | 6-OC$_2$H$_5$ | 2-CH$_3$ | —CH$_2$C$_6$H$_{11}$ | Red |
| 56 | 6-OC$_2$H$_5$ | 2-CH$_3$ | —CH$_2$C$_6$H$_5$ | Red |
| 57 | 6-OC$_2$H$_5$ | 2,7-di-CH$_3$ | —CH$_2$CH$_2$NHCOC=CHCH=CHO | Red |
| 58 | 6-OC$_2$H$_5$ | 2,7-di-CH$_3$ | —CH$_2$CH$_2$NHCOCH=CH$_2$ | Red |
| 59 | 6-OC$_2$H$_5$ | 2,7-di-CH$_3$ | —CH$_2$CH=CH$_2$ | Red |
| 60 | 6-OC$_2$H$_5$ | 2,7-di-CH$_3$ | —CH$_2$CH$_2$NHCOCH$_2$OC$_6$H$_5$ | Red |
| 61 | 6-OC$_2$H$_5$ | 2,7-di-CH$_3$ | —CH$_2$CH$_2$NHCOCH$_2$C$_6$H$_5$ | Red |
| 62 | 6-OC$_2$H$_5$ | 2,7-di-CH$_3$ | —CH$_2$CH$_2$NHCONHC$_2$H$_5$ | Red |
| 63 | 6-OC$_2$H$_5$ | 2-CH$_3$-7-NHCOCH$_2$OC$_6$H$_5$ | —CH$_2$CH(CH$_3$)$_2$ | Violet |
| 64 | 6-OC$_2$H$_5$ | 2-CH$_3$-7-NHCOCH(CH$_3$)$_2$ | —CH$_2$CH(C$_2$H$_5$)(CH$_2$)$_3$CH$_3$ | Violet |
| 65 | 6-OC$_2$H$_5$ | 2-CH$_3$-7-NHCO(CH$_2$)$_3$CH$_3$ | —CH$_2$CH$_2$CH$_3$ | Violet |
| 66 | 6-CH$_2$CH$_2$NHCOCH$_3$ | 2,2,4,7-tetra-CH$_3$ | —CH$_2$CH$_2$CONH$_2$ | Red |
| 67 | 6-CH$_2$CH$_2$NHSO$_2$CH$_3$ | 2,2,4,7-tetra-CH$_3$ | —CH$_2$CH$_2$CONH$_2$ | Red |
| 68 | 6-CH$_2$CH$_2$Cl | 2,2,4,7-tetra-CH$_3$ | —CH$_2$CH$_2$CONH$_2$ | Red |
| 69 | 6-CH$_2$CONH$_2$ | 2,2,4,7-tetra-CH$_3$ | —CH$_2$CH$_2$CONH$_2$ | Red |
| 70 | 6-OC$_2$H$_5$ | 2,2,4,7-tetra-CH$_3$ | —CH$_2$CH$_2$CONH$_2$ | Red |
| 71 | 6-OC$_6$H$_{11}$ | 2,2,4,7-tetra-CH$_3$ | —CH$_2$CH$_2$CONH$_2$ | Red |
| 72 | 6-CH$_2$NHCOCH$_3$ | 2,2,4,7-tetra-CH$_3$ | —CH$_2$CH$_2$CONH$_2$ | Red |
| 73 | 6-CH$_3$ | 2,2,4,7-tetra-CH$_3$ | —CH$_2$CH$_2$NHCOCH$_3$ | Red |
| 74 | 6-CH$_3$ | 2,2,4-tri-CH$_3$ | —CH$_2$CH$_2$NHCOCH$_3$ | Red |
| 75 | 6-CH$_3$ | 7-NHCOCH$_3$-2,2,4-tri-CH$_3$ | —CH$_2$CH$_2$NHCOCH$_3$ | Violet |
| 76 | 6-CH$_3$ | 2-CH(CH$_3$)$_2$ | —CH$_2$CH$_2$NHCOCH$_3$ | Red |
| 77 | 6-CH$_3$ | 7-CH$_3$-2-CH(CH$_3$)$_2$ | —CH$_2$CH$_2$NHCOCH$_3$ | Red |
| 78 | 6-CH$_3$ | 2,7-di-CH$_3$ | —CH$_2$CH$_2$NHCOCH$_3$ | Red |
| 79 | 6-OCH$_3$ | 7-CH$_3$-2-CH(CH$_3$)$_2$ | —CH$_2$CH$_2$NHCOC$_2$H$_5$ | Red |
| 80 | 6-OCH$_3$ | 2,2,4-tri-CH$_3$ | —CH$_2$CH$_2$NHCOCH$_3$ | Red |
| 81 | 6-OCH$_3$ | 7-NHCOCH$_3$-2-CH$_3$ | —CH$_2$CH$_2$NHCOCH$_3$ | Violet |
| 82 | 6-OCH$_3$ | 2,7-di-CH$_3$ | —CH$_2$CH$_2$NHCOCH$_2$OH | Red |
| 83 | 4-CH$_3$ | 2,7-di-CH$_3$ | —CH$_2$CH$_2$CH$_2$NHCH$_2$OCH$_3$ | Red |
| 84 | 5-CH$_3$ | 2,7-di-CH$_3$ | —CH$_2$CH$_2$CH$_2$NHCOCH$_2$OH | Red |
| 85 | 4-OCH$_3$ | 2,7-di-CH$_3$ | —CH$_2$CH$_2$NHCOC$_6$H$_{11}$ | Red |
| 86 | 5-NHCOCH$_3$ | 2,7-di-CH$_3$ | —CH$_2$CH$_2$NHCOC=CHCH=CHO | Red |
| 87 | 6-NHCOCH$_3$ | 2,7-di-CH$_3$ | —CH$_2$CH$_2$NHCOC$_6$H$_5$ | Red |
| 88 | 6-Cl | 2,7-di-CH$_3$ | —CH$_2$CH$_2$NHCOC$_6$H$_{11}$ | Red |
| 89 | 6-OCH$_2$CH$_2$OCH$_3$ | 2,7-di-CH$_3$ | —CH$_2$CH$_2$NHCOCH$_2$C$_6$H$_5$ | Red |
| 90 | 6-OCH$_2$CH$_2$NHSO$_2$CH$_3$ | 2,7-di-CH$_3$ | —CH$_2$CH$_2$NHCOCH$_2$OC$_6$H$_5$ | Red |
| 91 | 6-OCH$_2$CH$_2$NHSO$_2$CH$_3$ | 2,7-di-CH$_3$ | —CH$_2$CH$_2$NHCOCH$_2$Cl | Red |
| 92 | 6-OCH$_2$CH$_2$NHSO$_2$CH$_3$ | 2,7-di-CH$_3$ | —CH$_2$CH$_2$NHCOCH=CH$_2$ | Red |
| 93 | 6-OCH$_2$CH$_2$NHCOCH$_3$ | 2,7-di-CH$_3$ | —CH$_2$CH$_2$NHCOCH$_2$CN | Red |
| 94 | 6-OCH$_2$CH$_2$NHCOCH$_3$ | 2,2,4-tri-CH$_3$ | —CH$_2$CH$_2$NHCOCH$_3$ | Red |
| 95 | 6-OCH$_2$CH$_2$NHCOCH$_3$ | 2,2,4,7-tetra-CH$_3$ | —CH$_2$CH$_2$NHCOCH$_3$ | Red |
| 96 | 6-OCH$_2$CH$_2$OOCCH$_3$ | 2,2,4,7-tetra-CH$_3$ | —CH$_2$CH$_2$NHCOCH$_3$ | Red |
| 97 | 4-CH$_2$CH$_2$OH | 2,7-di-CH$_3$ | —CH$_2$CH$_2$NHCOCH$_3$ | Red |
| 98 | 6-OC$_6$H$_{11}$ | 2,7-di-CH$_3$ | —CH$_2$CH$_2$NHCOCH$_3$ | Red |
| 99 | 6-OC$_6$H$_5$ | 2,7-di-CH$_3$ | —CH$_2$CH$_2$NHCOCH$_3$ | Red |
| 100 | 6-OCH$_2$CH$_2$C$_6$H$_5$ | 2,7-di-CH$_3$ | —CH$_2$CH$_2$NHCOCH$_3$ | Red |
| 101 | 6-NHCOOC$_2$H$_5$ | 2,7-di-CH$_3$ | —CH$_2$CH$_2$NHCOCH$_3$ | Red |
| 102 | 6-CH$_2$NHCOCH$_3$ | 2,7-di-CH$_3$ | —CH$_2$CH$_2$NHCOCH$_3$ | Red |
| 103 | 6-OCH$_2$CH(OH)CH$_2$OH | 2,2,4,7-tetra-CH$_3$ | —CH$_2$CH$_2$NHCOCH$_3$ | Red |
| 104 | 6-O(CH$_2$CH$_2$O)$_2$H | 2,2,4,7-tetra-CH$_3$ | —CH$_2$CH$_2$NHCOCH$_3$ | Red |
| 105 | 6-O(CH$_2$CH$_2$O)$_2$CH$_3$ | 2,2,4,7-tetra-CH$_3$ | —CH$_2$CH$_2$NHCOCH$_3$ | Red |

TABLE 1-continued

| Example 1 | $R^1, R^2$ | $R^3, R^4, R^5, R^6$ | $R^7$ | Color |
|---|---|---|---|---|
| 106 | 6-OCH$_2$CH$_2$OOCOC$_2$H$_5$ | 2,2,4,7-tetra-CH$_3$ | —CH$_2$CH$_2$NHCOCH$_3$ | Red |

The novel azo compounds can be applied to polyamide textile materials according to known disperse dyeing techniques. Various dispersing and wetting agents can be employed in the dispersion of the finely divided dye compound in an essentially aqueous dyebath. Procedures by which the compounds of the invention can be applied to polyamide textile materials are described in U.S. Pat. Nos. 3,100,134 and 3,320,021. The following example illustrates a method for applying the novel compounds to polyamide fibers.

EXAMPLE 107

The azo compound (16.7 mg.) of Example 1 is dispersed in 10 cc. of 2-methoxyethanol. A small amount (3–5 cc.) of a 3% sodium lignin sulfonate solution is added, with stirring, and then the volume of the bath is brought to 150 cc. with water. A 5 g. textile fabric made of nylon 66 fibers is placed in the bath and worked 10 minutes without heat. The bath is then slowly brought to the boil over a 30-minute period and the dyeing is carried out at the boil for one hour. The dyed fabric is then removed from the dyebath, rinsed with water and dried in an oven at 250° F. The fabric is dyed a bright shade of red exhibiting excellent fastness properties when tested in accordance with the procedures described in the *Technical Manual of the American Association of Textile Chemists and Colorists*, 1968 edition.

The polyamide materials which can be dyed with the novel azo compounds are well known and include nylon 66 (polyhexamethylene adipamide) manufactured by the polymerization of adipic acid and hexamethylenediamine, nylon 6 (polycaprolactum) prepared from epsilon-aminocaproic acid lactum (caprolactum) and nylon 8. A detailed description of the synthetic polyamide materials which are dyed bright, fast shades by the compounds of the invention is set forth in U.S. Pat. No. 3,100,134.

The invention has been described in detail with particular reference to preferred embodiments thereof, but it will be understood that variations and modifications can be effected within the spirit and scope of the invention.

I claim:

1. A compound having the formula

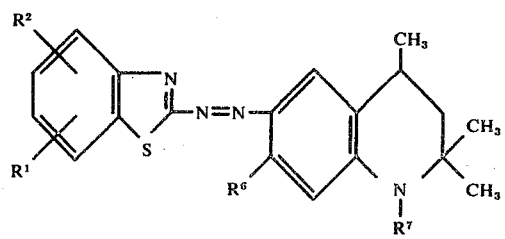

wherein $R^1$ is hydrogen; lower alkyl; lower alkyl substituted with carbamoyl, lower alkylsulfonamido, or —NH-CO—$R^8$; lower alkoxy; lower alkoxy substituted with lower alkylsulfonamido, aryl, lower alkoxy or —NHCO—$R^8$; cyclohexoxy; aryloxy; chlorine; or lower alkanoylamino;

$R^2$ is hydrogen, lower alkyl, lower alkoxy, chlorine or bromine, or, when $R^1$ is hydrogen, $R^2$ is lower alkyl or lower alkoxy;

$R^6$ is hydrogen, lower alkyl, lower alkoxy or —NH-CO—$R^8$;

$R^7$ is lower alkyl substituted with lower alkoxy, cyano, aryl, cyclohexyl, ureido, ethylureido, —NH-CO—$R^8$, or

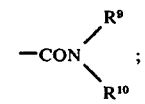

$R^8$ is hydrogen; lower alkyl; lower alkyl substituted with hydroxy, lower alkoxy, cyano, aryl, chlorine, or aryloxy; cyclohexyl; lower alkoxy; furyl; lower alkenyl; or aryl;

$R^9$ individually is hydrogen or lower alkyl;

$R^{10}$ individually is hydrogen or lower alkyl; and $R^9$ and $R^{10}$ collectively are pentamethylene or ethyleneoxyethylene;

in which each aryl group is phenyl or phenyl substituted with lower alkyl, lower alkoxy, chlorine or bromine.

2. A compound according to claim 1 having the formula

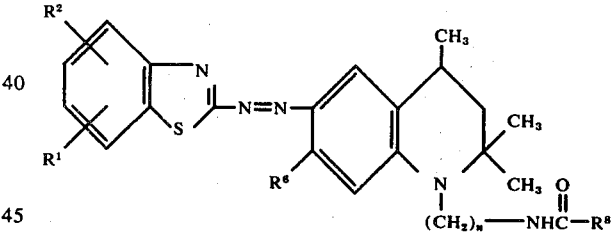

wherein $R^1$ is hydrogen; lower alkyl; lower alkyl substituted with carbamoyl, lower alkylsulfonamido, or —NH-CO—$R^8$; lower alkoxy; lower alkoxy substituted with lower alkylsulfonamido, aryl, lower alkoxy, or —NHCO—$R^8$; cyclohexoxy; aryloxy; chlorine; or lower alkanoylamino;

$R^2$ is hydrogen, lower alkyl, lower alkoxy, chlorine or bromine, or, when $R^1$ is hydrogen, lower alkyl or lower alkoxy;

$R^6$ is hydrogen, lower alkyl, lower alkoxy or —NH-CO—$R^8$;

$n$ is 2 or 3; and $R^8$ is hydrogen; lower alkyl; lower alkyl substituted with hydroxy, lower alkoxy, cyano, aryl, chlorine, or aryloxy; cyclohexyl; lower alkoxy; furyl; lower alkenyl; or aryl.

3. A compound according to claim 1 wherein $R^1$ is methyl, methoxy or ethoxy; $R^2$ is hydrogen; $R^6$ is hydrogen, methyl or acetamido; and $R^7$ is lower alkyl, carbamoylethyl or acetamidoethyl.

4. A compound according to claim 1 having the formula
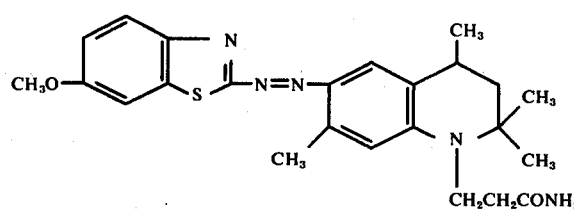
5. A compound according to claim 1 having the formula
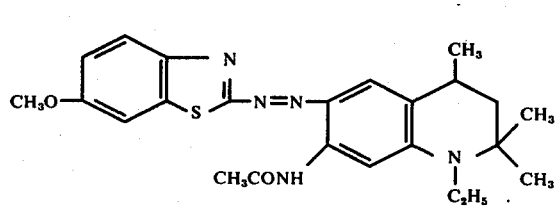
6. A compound according to claim 1 having the formula
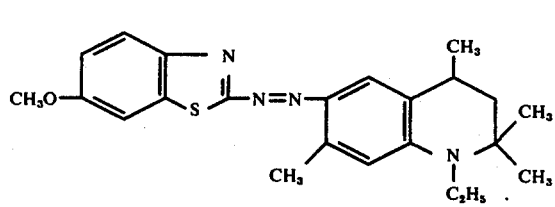
7. A compound according to claim 1 having the formula
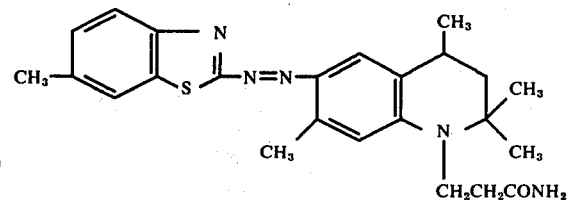
8. A compound according to claim 1 having the formula
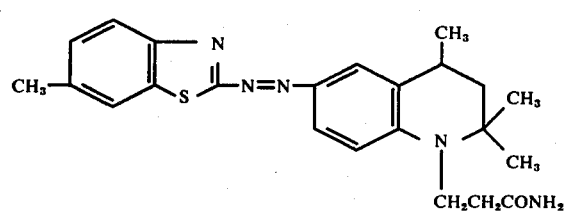
9. A compound according to claim 1 having the formula
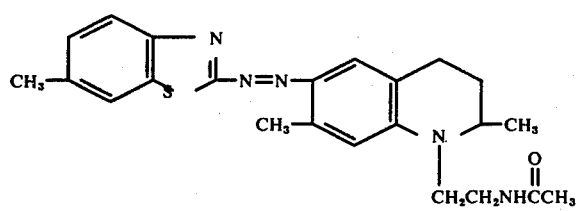
* * * * *